United States Patent
Cudini et al.

[11] Patent Number: 5,182,974
[45] Date of Patent: Feb. 2, 1993

[54] DUAL SPINDLE VERTICAL AXIS CNC PISTON TURNING AND GROOVING MACHINE

[75] Inventors: A. Mario Cudini, Grosse Point Farms; Horst Roman, Sterling Heights; Kenneth A. Drew, Harper Woods, all of Mich.

[73] Assignee: The Cross Company, Fraser, Mich.

[21] Appl. No.: 716,186

[22] Filed: Jun. 17, 1991

[51] Int. Cl.5 .............................................. B23B 3/34
[52] U.S. Cl. .......................................... 82/124; 82/129
[58] Field of Search .................... 82/129, 124, 125, 18; 29/38 A, 38 B

[56] References Cited

U.S. PATENT DOCUMENTS

| 2,454,916 | 11/1948 | Gamble | 82/125 X |
| 2,651,832 | 9/1953 | Menard et al. | 82/18 X |
| 3,935,765 | 2/1976 | Peltier | 82/124 X |
| 4,862,777 | 9/1989 | Sakurai et al. | 82/18 X |

FOREIGN PATENT DOCUMENTS 0004553 1/1987 Japan ................................. 409/80

Primary Examiner—Larry I. Schwartz
Assistant Examiner—J. R. Daulton
Attorney, Agent, or Firm—John R. Benefiel

[57] ABSTRACT

A linear motor piston turning and grooving machine (10) for turning non-round diameters and complex shaped pistons (W) in which a pair of oppositely facing CNC turning modules (14, 16) each are aligned with one of a pair of a vertical axis spindles (30, 32) having chucks (26, 28) for each piston (W). An overhead tailstock assembly (34, 36) is centered over each spindle (30, 32). A grooving mechanism (106, 108) is located to the rear of each tailstock assembly (34, 36) and includes a rocking support shaft (110, 112) for bringing tooling (114, 116) into engagement with the piston (W).

10 Claims, 7 Drawing Sheets

DUAL SPINDLE VERTICAL AXIS CNC PISTON TURNING AND GROOVING MACHINE

This invention concerns machines for turning and grooving of pistons, and more particularly non round or elliptically shaped pistons. In such machines, the outside diameter is turned by a tool holder rapidly moved in and out to produce the elliptical shape. In the past, cam mechanisms were employed to control the tool movement, and such machines were configured with dual vertical axis spindles for increased productivity.

In U.S. Pat. No. 4,653,360 issued on Mar. 31, 1987 for a "CNC Turning Machine" an improved design for such machines is described in which the turning tool is controlled using a linear motor or "voice coil" motor.

In the prior dual spindle cam machines considerable complexity was involved in the movements of the machine components and load-unload mechanism was required because of the arrangement of the turning and grooving tool mechanisms made access difficult. In some designs, the grooving mechanism resulted in so called "skiving" cutting in which changing cutting tool angles were encountered, resulting in less reliable grooving action.

The present invention is intended to provide the increased production efficiency of dual vertical axis machine for CNC type piston turning machines, with a minimum of complexity in the motions required for automated loading and loading of the pistons.

SUMMARY OF THE INVENTION

The present invention comprises a turning machine architecture in which a pair of vertical axis side by side spindles each carry a chuck for holding a respective piston, and in which an overhead aligned tailstock is adapted to be moved down against a piston in a respective chuck to locate the same during turning and grooving.

A CNC turning module is located at the outside of each spindle, in aligned and facing relationship to the other. Each module is mounted to a slide adapted to be raised or lowered by a suitable drive mechanism such as a ball screw, preferably driven by a common drive motor and respective belt drives.

A grooving mechanism is located to the rear of each spindle, each mechanism including an angled carrier mounted for rocking rotation about a vertical axis directly to the rear of the spindle axis. A roughing grooving tool is mounted to one arm, brought into engagement by operation of a mechanism pivoting the arm towards the chucked piston.

Finish grooving and chamfering tools are mounted to the other arm of the carrier, both brought into engagement with the piston by rocking of the carrier in the other direction.

Upon elevation of the CNC turning modules and tailstocks, a transfer mechanism is able to unload and reload pistons from the front of the machine with relatively minimal movement of the transfer mechanism.

Thus, the increased productivity of a vertical axis dual spindle machine is provided for a CNC turning machine, and good frontal access is provided to the pistons in the machine by a transfer mechanism, such that complexity of the machine and transfer mechanism is reduced over what has been required in other vertical axis piston turning and grooving machines.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
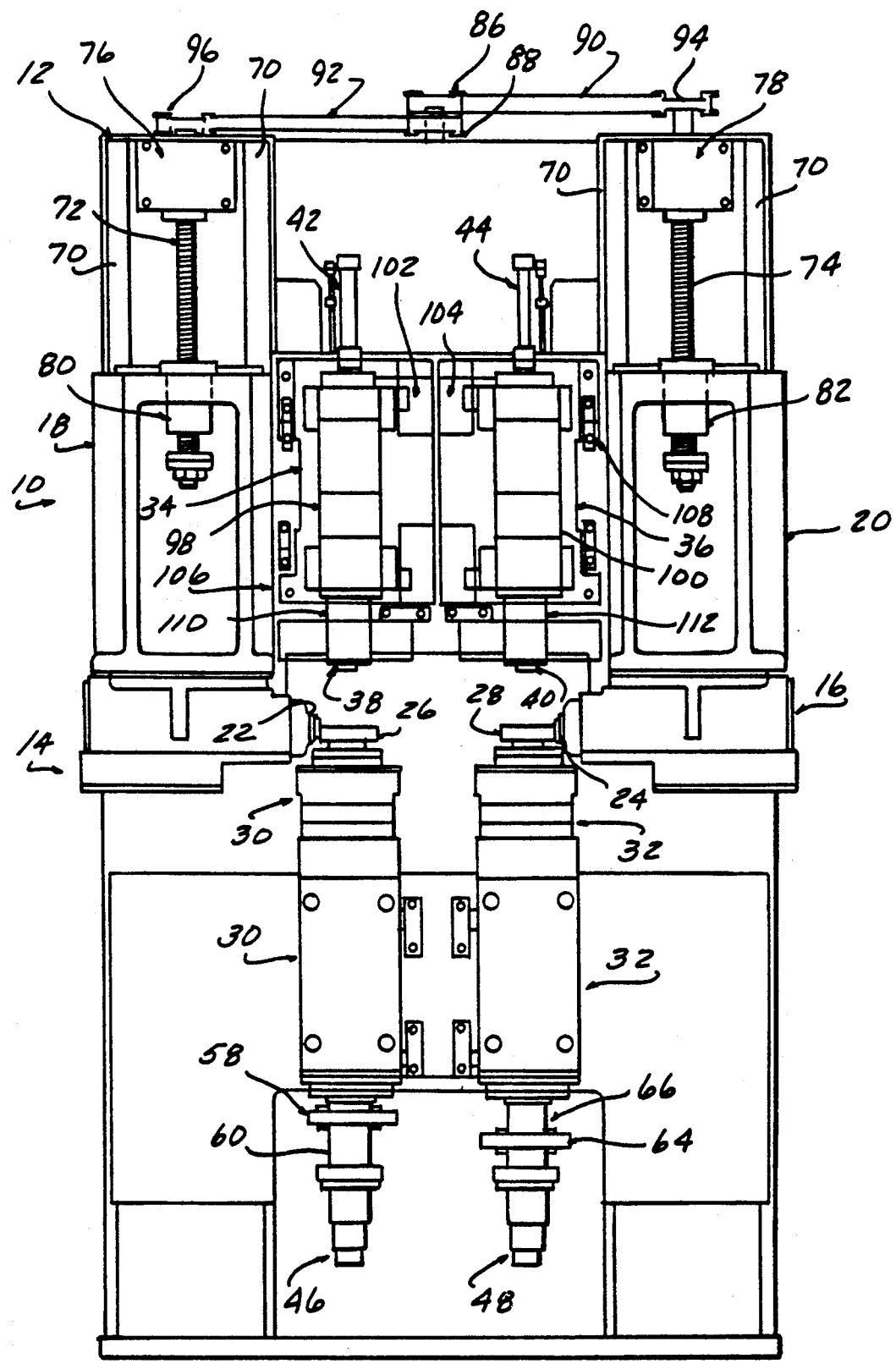
FIG. 1 is a front elevational view of a CNC piston turning and grooving machine according to the present invention.

FIG. 1 shows the arrangement of the major components of a piston and turning machine 10 mounted on the machine frame 12.

Two CNC turning modules 14, 16 are provided, each mounted to a main slide 18, 20. Each CNC turning module 14, 16 is horizontally disposed, arranged facing each other from a respective side of the machine 10 so as to position a tooling plunger 22, 24 in line with the axis of a piston chuck 26, 28 mounted on a respective vertical axis spindle assembly 30, 32.

Each vertical axis spindle assembly 30, 32 is aligned beneath a tailstock assembly 34, 36, having a tailstock 38, 40 able to be raised and lowered by means of a power cylinder 42, 44. An antirotation latch may also be provided, operated by a power cylinder 43, 45 which may consist of a transversely extending pin (not shown) driven by a slider cam operated by power cylinder 43, 45 to prevent tailstock rotation when retracted.

A power cylinder 46, 48 may be provided to operate each chuck 26, 28, which may be of a spring finger design so as to securely grip a piston (W) loaded thereinto. Coolant nozzles 35 are arrayed to direct coolant jets during machining.

The spindles 30, 32 are bolted to a vertical mounting flange 31 of the machine frame 12, with locating blocks 33 also secured to the flange 31.

Figure 2:
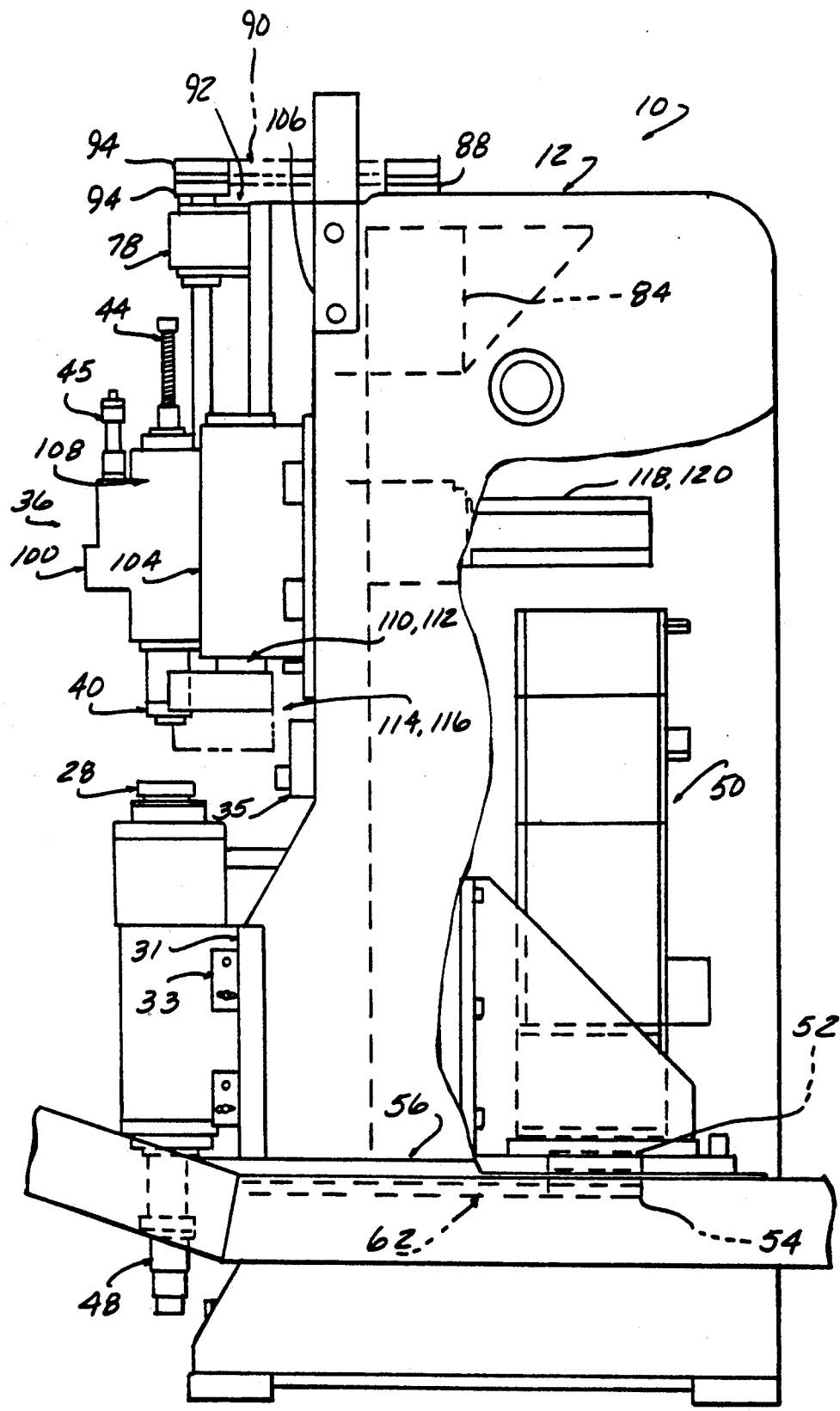
FIG. 2 is a side elevational view of the machine shown in FIG. 1.
Figure 3:
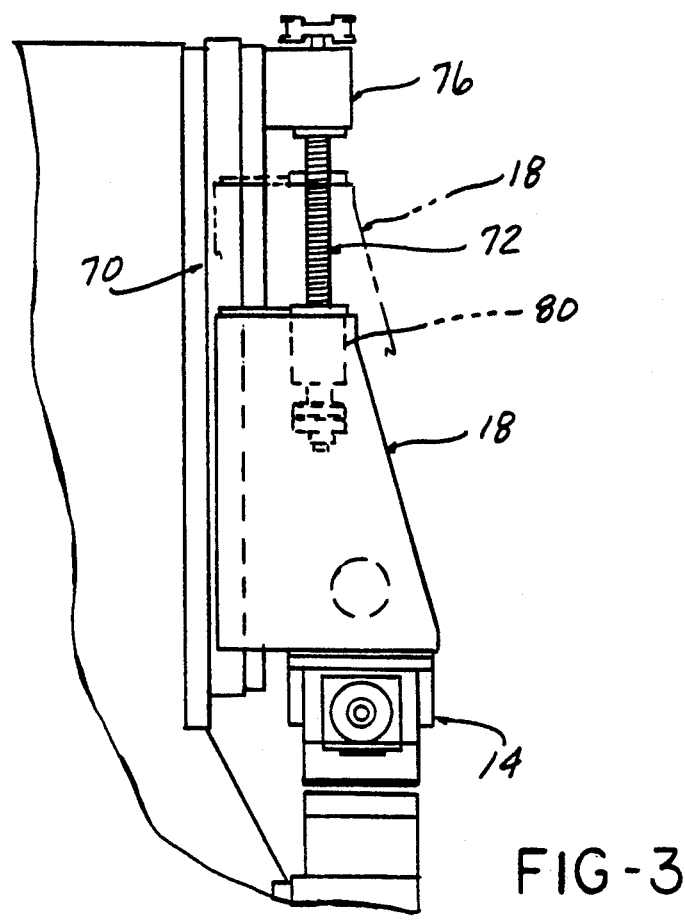
FIG. 3 is a fragmentary opposite side elevational view of the machine shown in FIG. 2, showing details of the main slide and CNC turning module.
Figure 5:
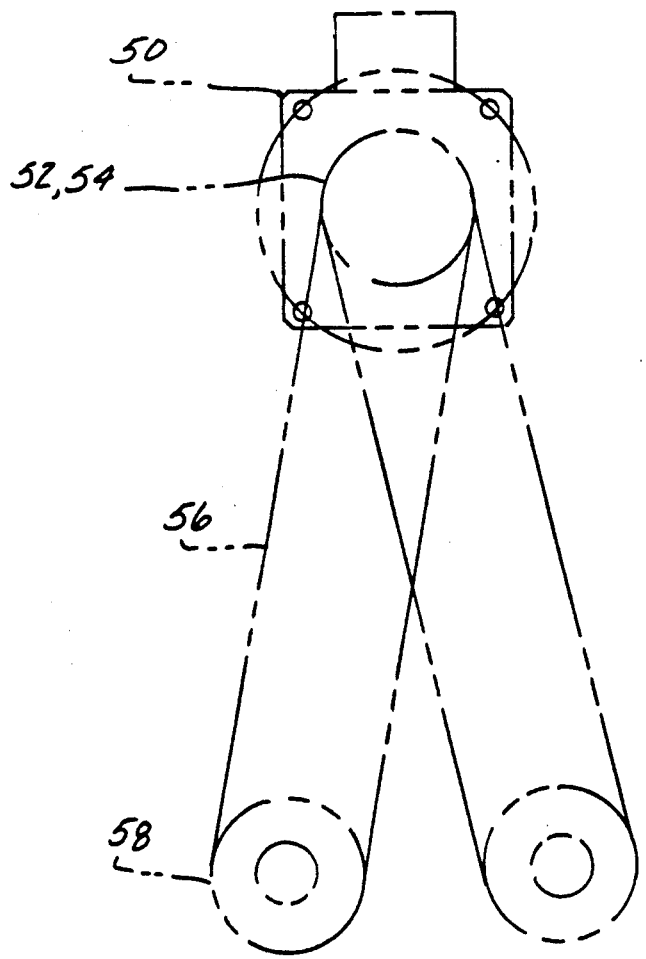
FIG. 5 is a view of the spindle drive components of the machine shown in FIG. 1.

FIGS. 2 and 5 show that the spindles 30, 32 are driven by a single drive motor 50 mounted in the rear of the housing 12 driving a pair of pulleys 52, 54. Pulley 52 has a belt 56 which rotates a pulley 58 affixed to spindle shaft 60 of spindle assembly 30, while pulley 54 drives a belt 62 which rotates a pulley 64 affixed to a spindle shaft 66 of spindle assembly 32.

Each main slide 18, 20 is mounted on ways 70 and raised and lowered thereon by rotation of a ball screw shaft 72, 74 supported at one end in bearing 76, 78 and driving a ball nut 80, 82 fixed in the slide 18, 20.

Figure 4:
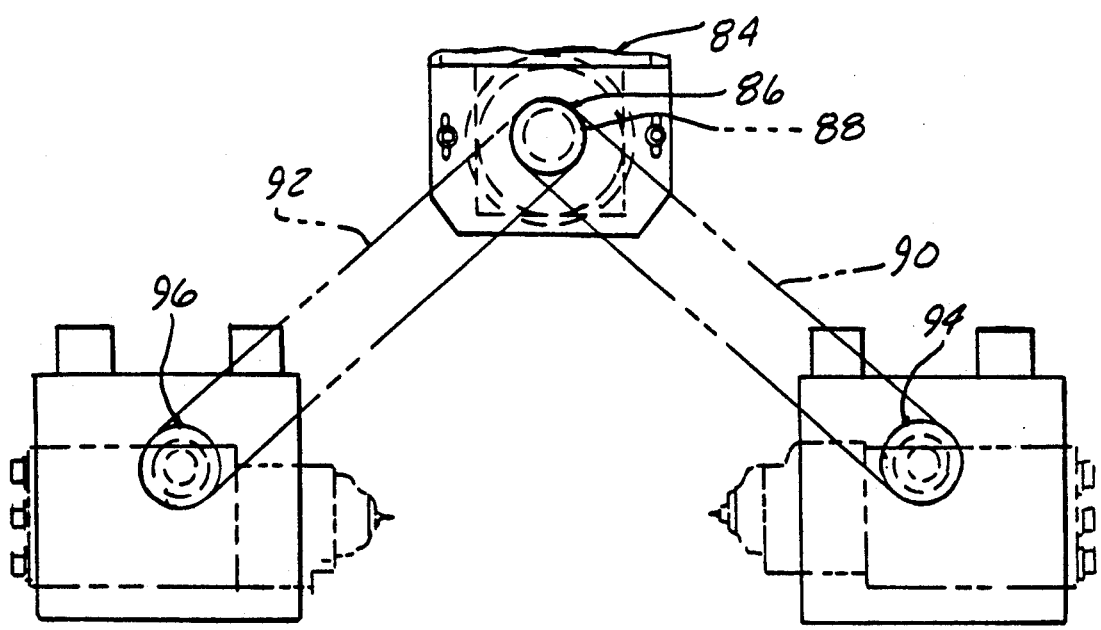
FIG. 4 is a top view of the spindle drive components of the machine shown in FIG. 1.

FIGS. 1, 2 and 4 show that ball screw shafts 72, 74 are driven by a single drive motor 84 rotating a pair of pulleys 86, 88, each engaged with a drive belt 90, 92.

Drive belt 90 rotates a pulley 94 affixed to ball screw shaft 74, and drive belt 92 rotates pulley 96 affixed to ball screw shaft 72.

Each tailstock 38, 40 is mounted in an associated tailstock housing 98, 100, in turn fixed to a grooving mechanism housing 102, 104 immediately to the rear of its associated tailstock housing 98, 100.

The grooving mechanism housing 102, 104 in turn are affixed to a forward face 106 of a column portion of the machine frame 12.

The grooving mechanism housing 102, 104 are part of grooving mechanisms 106, 108, which also each include grooving tooling rocking support shafts 110, 112, mounted to the rear and aligned with the axis of the associated tailstock 38, 40 and spindle 30, 32.

Grooving tooling 114, 116 is mounted to each rocking support shaft 110, 112, which is able to be rocked to alternately bring rough grooving and finish grooving and chamfer tools into engagement with the piston, as will be described hereinafter in further detail.

Figure 9:
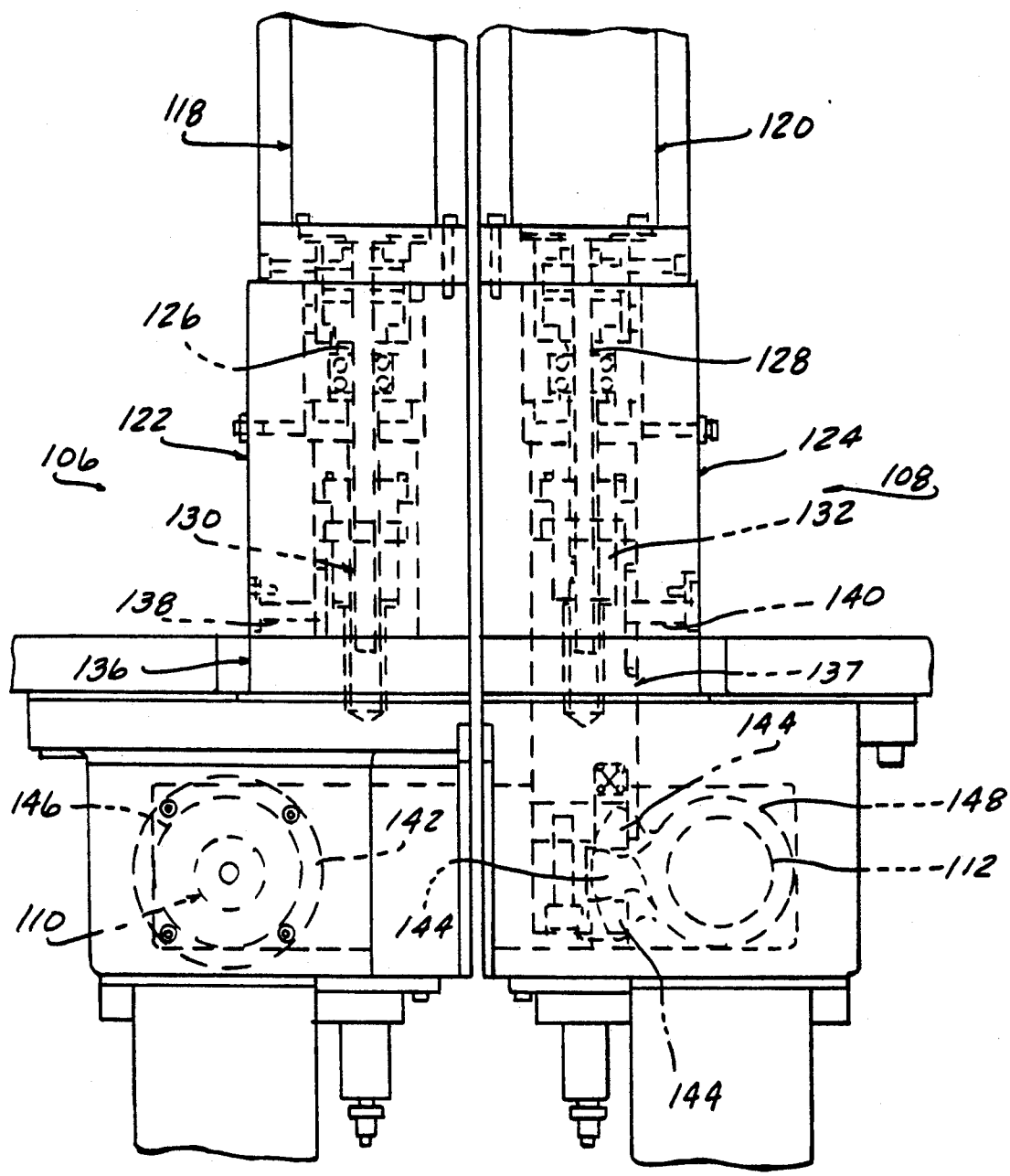
FIG. 9 is a plan view of the grooving mechanisms incorporated in the machine shown in FIG. 1.

The rocking support shafts 110, 112 are each driven by a respective servo motor 118, 120 (FIG. 9) fixed to the rear of a housing 122, 124 projecting horizontally to the rear through an opening in the column portion 106.

The servo motors 118, 120 each rotate shafts 126, 128, having a screw section causing linear travel of a ball nut 130, 132.

Attached to each ball nut 130, 132 is an associated carrier 134, 136 each of which rotationally immobilized by a pin 138, 140 traveling in a slot.

Each carrier 134, 136 entraps a protrusion 142, 144 on a yoke 146, 148 attached to the associated rocking shaft 110, 112.

Figure 7:
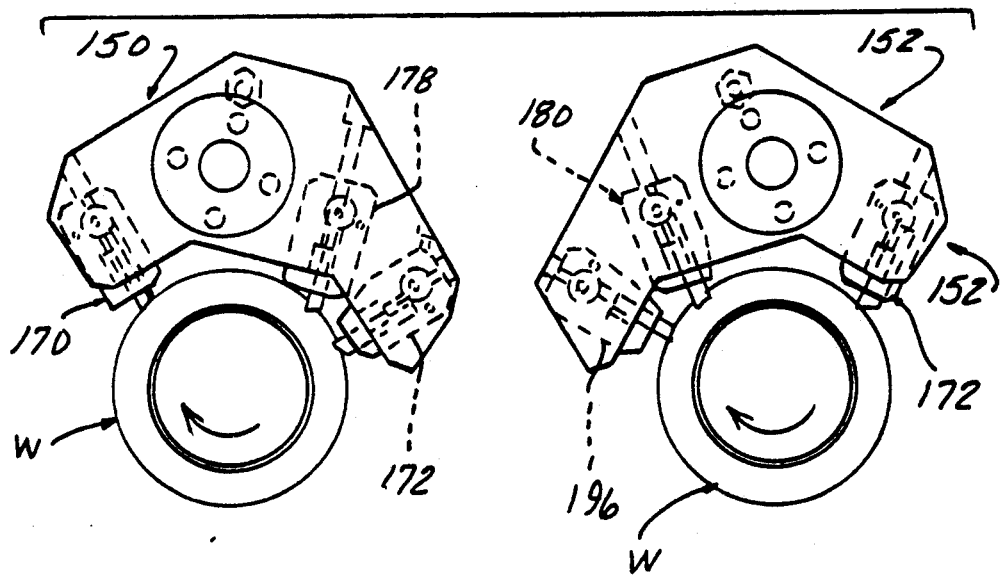
FIG. 7 is a plan view of the grooving mechanisms in the centered condition.
Figure 6:
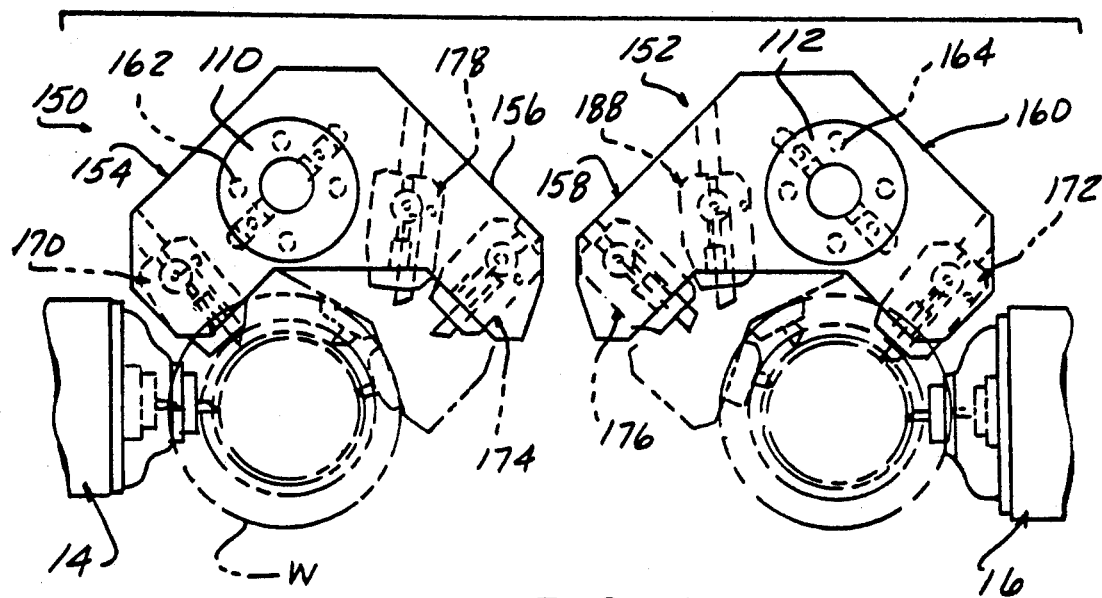
FIG. 6 is an enlarged plan view of the turning and grooving tooling with phantom line depiction of the CNC turning modules and pistons, showing either grooving tooling in the roughing and finish grooving position respectively.
Figure 8:
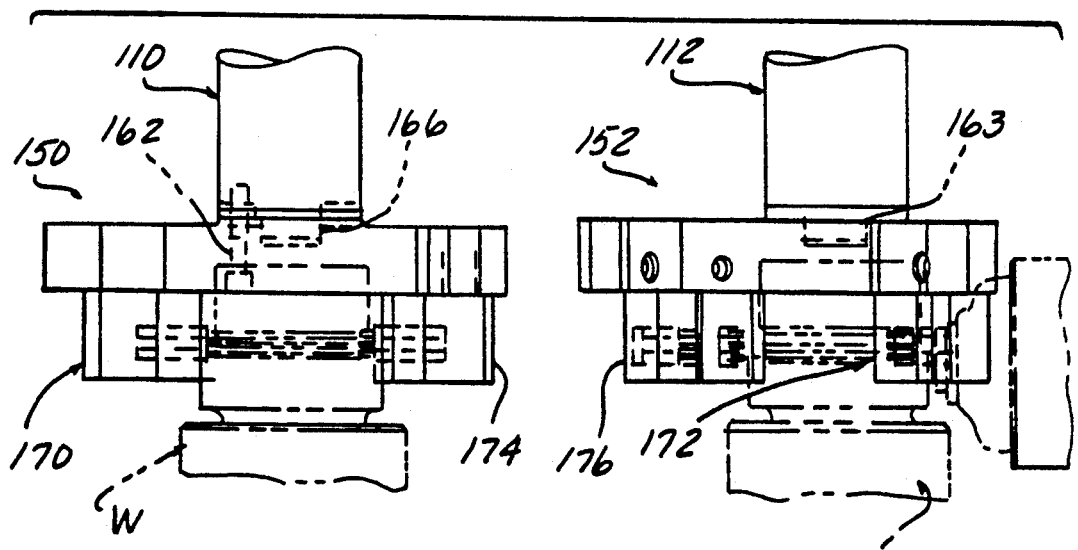
FIG. 8 is an elevational view of the grooving tooling shown in FIG. 6.

FIGS. 6–8 show the details of grooving tooling of each grooving mechanism, including a crescent shaped tooling plate 150, 152 each having pairs of carrier arms 154, 156 and 158, 160 outwardly angled from the pivot axis so as to extend on either side of the piston W. The tooling plates 150, 152 are fixed to the respective rocking shaft 110, 112 by means of screws 162, 164, a pilot section 166, 168 proving an accurate location.

A downwardly projecting rough turning groove tooling post 170, 172 is mounted to the outside arm 154, 160 of each tooling plate 150, 152. A finish turning groove tooling post 174, 176 and groove chamfering tooling post 178, 180 downwardly project from the inside arm 16, 158 of each tooling plate 150, 152.

The tooling plates 150 are rocked to alternately bring the rough and finish and chamfering tooling into engagement with the piston W to be machined, and assumes a centered rest position during workpiece loading and/or tool change.

The main slides 18, 20 are also elevated as are the tail stocks 38, 40 preparatory to loading and unloading of workpieces W.

This arrangement of components allows good access to the chucks 26, 28 for loading and unloading.

Figure 10:
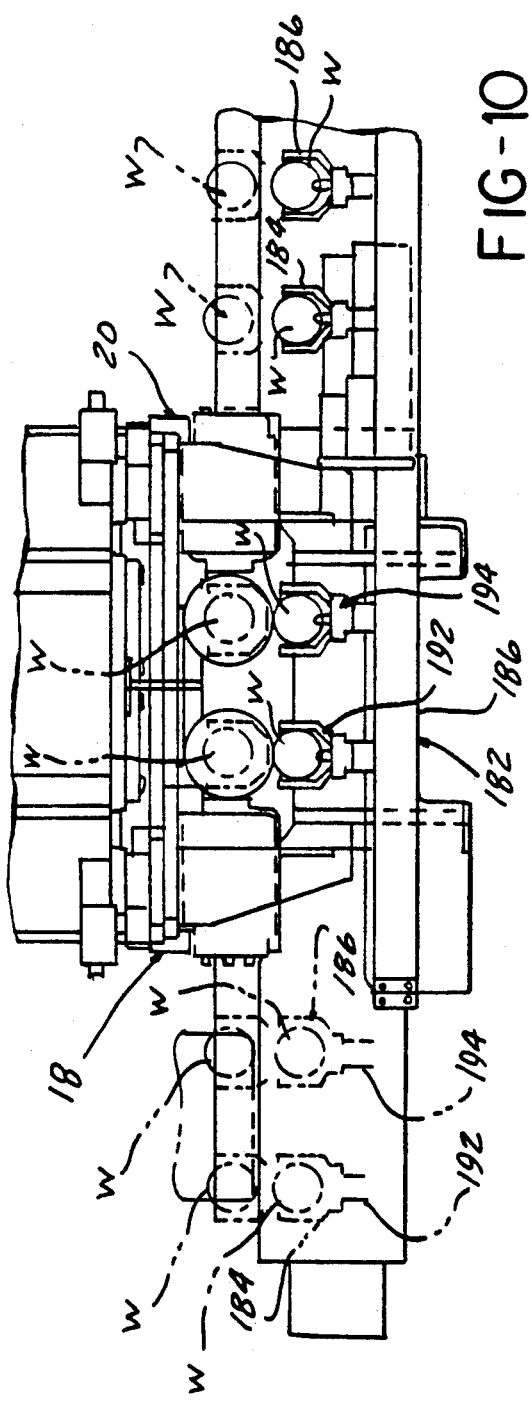
FIG. 10 is a diagrammatic plan view of a machine having part handling automation installed thereon.
Figure 11:
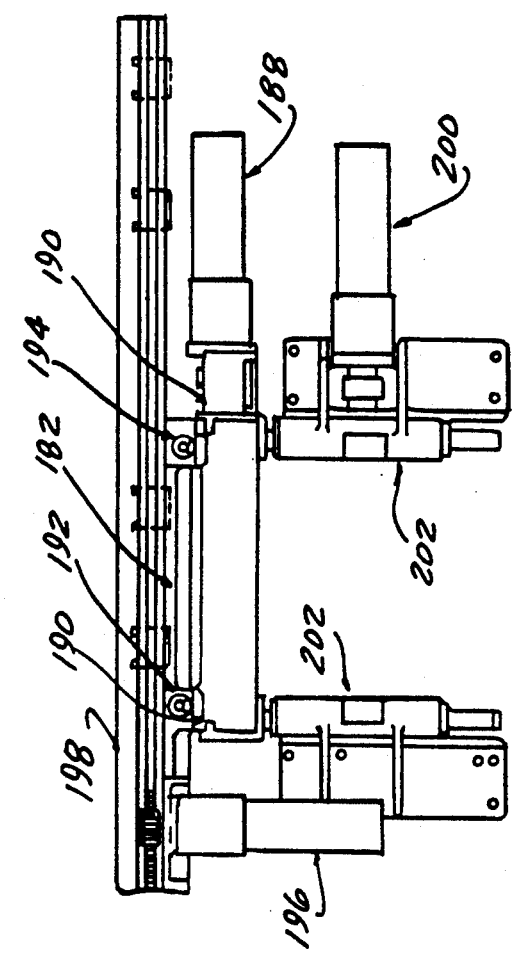
FIG. 11 is a front elevational view of the loader shown in FIG. 10.

FIGS. 10 and 11 show a typical loading mechanism, in which a transfer slide 182 is mounted to the front of the machine 10 carrying a pair of grippers 184, 186.

The transfer slide 182 driven by an in and out motor 188 and rack and pinion 190 moves in from a centered position to reach the pistons W in the chucks. Grippers 192, 194 open and close to grip the pistons W and retract with the same. A transfer motor 196 and rack and pinion 198 advances the slide 182 to the left to an unload station, thereafter moving in and being lowered by an elevator motor 200 and rack and pinion 202.

The process is reversed and the slide 182 advanced opposite a pickup station as shown for pick up of a pair of unmachined pistons W.

We claim:

1. A dual spindle piston turning and grooving machine (10) for simultaneous turning of non round, complex profiles of diameters of two pistons and also grooving of the diameters of said pistons, comprising:

a pair of spaced apart linear motor turning modules (14, 16) each carrying a turning tool electrically controlled to move in and out along an axis, each turning module arranged with its axis horizontal and facing the other turning module;

a machine frame having a front and back;

a pair of main slides (18, 20) each mounting a turning module (14, 16), each main slide mounted at the front of said machine frame to be vertically movable on said machine frame;

means (72, 74, 76, 78, 80, 82, 84, 86, 88, 90, 92, 94, 96) for raising and lowering each of said main slides (18, 20) to and between lowered and raised positions;

a pair of vertical axis spindles (30, 32) mounted on said machine frame between said turning modules, each vertical axis spindle extending alongside a respective turning module (14, 16) and located inside and between said pair of turning modules (14, 16);

means (50, 52, 54, 56, 58, 60, 62, 64, 66) for rotating each spindle (18, 20) about its vertical axis;

a piston clamping chuck (26, 28) mounted in each spindle (30, 32) adapted to receive and hold a respective piston (W) to be rotated by a respective spindle (30, 32);

each turning module in the lowered position of an associated main slide aligned with a piston in a respective adjacent chuck and in a raised position of said associated main slide clearing the area to the outside of the associated chuck;

a pair of vertical axis tailstock assemblies (34, 36) each aligned with and vertically spaced from a respective spindle (18, 20), each tailstock assembly (34, 36) having a tailstock portion (38, 40) and means (42, 44) for moving each tailstock portion (38, 40) axially to engage and disengage said tailstock portion (38, 4) with a piston (W) in a respective chuck (26, 28);

a pair of grooving mechanisms (106, 108) each mounted on said machine frame behind a respective tailstock assembly (34, 36) and spindle (30, 32), each grooving mechanism (106, 108) including a vertically extending support shaft (110, 112) rotatable about the longitudinal axis thereof, and means (118, 120, 122, 124) for rocking each of said support shafts (110, 112) about said vertical longitudinal axis in either direction;

grooving tooling (114, 116) mounted to each support shaft (110, 112) brought into engagement by said rocking of said support shaft (110, 112) in either direction.

2. The dual spindle piston turning and grooving machine (10) according to claim 1 wherein each of said grooving mechanisms (106, 108) includes a crescent shaped plate (150, 152) mounted to a respective support shaft (110, 112), each crescent shaped plate having forwardly angled tooling pairs of support arms (154, 156, 158, 160), each pair extending on either side of the axis of an associated spindle (30, 32) and tailstock assembly (24, 26) so that rocking of said associated support shaft (110, 112) about its vertical axis swings one arm of said pairs of supports arms (154, 156, 158, 160) into a piston (W) in said chuck (26, 28).

3. The dual spindle piston turning and grooving machine (10) according to claim 1 wherein said means for rotating each spindle (30, 32) includes a single spindle drive motor (50) mounted at the rear of said machine frame, and belt and pulley drive means (52, 54, 56, 58, 60, 62) interengaging said motor (50) and each of said spindles (30, 32) to be driven thereby.

4. The dual spindle piston turning and grooving machine (10) according to claim 3 wherein each of said spindles (30, 32) is located extending upwardly from the bottom of said machine frame, said spindle drive motor (50) extending downwardly, with said belt and pulley drive means (52, 54, 56, 58, 60, 62) located at the lower end of said spindle drive motor (50) and each of said spindles (30, 32).

5. The dual spindle piston turning and grooving machine (10) according to claim 1 wherein said means for raising and lowering each of said main slides (18, 20) comprises a single drive motor (84), a pair of vertical screw shafts (72, 74), means (76, 78) drivingly connecting each screw shaft (72, 74) and a respective main slide (18, 20) causing said raising or lowering upon rotation of said screw shafts (72, 74) in either direction; and drive means (88, 90, 92, 94, 96) interengaging either screw shaft (72, 74) and said drive motor (84).

6. The dual spindle piston turning and grooving machine frame according to claim 5 wherein each of said screw shafts (72, 74) extend tot he top of said machine (10) and said drive motor (84) is mounted to extend vertically at the top and rear of said machine (10).

7. The dual spindle piston turning and grooving machine (10) according to claim 1 wherein each of said grooving mechanisms (108, 110) include a housing (108, 110) fastened to a vertical front face (106) of said machine frame and wherein each of said tailstock assemblies (34, 36) include a housing (98, 100) fastened to the front side of a respective one of said grooving mechanism housings (108, 110).

8. The dual spindle piston turning and grooving machine (10) according to claim 7 wherein each of said spindles (30, 32) are fastened to a flange face (31) at the lower end of said machine frame beneath said vertical front face (106) of said machine frame.

9. The dual spindle piston turning and grooving machine (10) according to claim 1 further including a transfer slide (182), and a pair of side by side gripper mechanisms (184, 186) and means (188, 190) for moving said transfer slide (182) horizontally into said machine (10) from the front to grip a pair of pistons (W) in respective chucks (26, 28) and withdrawing the same.

10. The dual spindle piston turning and grooving machine (10) according to claim 9 further including transfer drive means (196, 198) for advancing said transfer slide (182) to unload and load positions located on either side of said machine respectively.

* * * * *